UNITED STATES PATENT OFFICE.

ORAZIO LUGO, OF NEW YORK, N. Y.

IMPROVEMENT IN DISTILLING PETROLEUM AND OTHER SUBSTANCES.

Specification forming part of Letters Patent No. 51,843, dated January 2, 1866.

*To all whom it may concern:*

Be it known that I, ORAZIO LUGO, M. D., of the city, county, and State of New York, have invented a new and valuable improvement in distillation by forcing into or through a still or stills a current of air or other suitable gaseous substance, cold or otherwise, for the purposes below more fully specified.

Experience has shown to me that when I force into the distilling-vessel, during the process of distillation, a current of air or other suitable gaseous substance, so that the same is made to mingle with and propel the vapors through the condenser, the product becomes deodorized and purified in a most remarkable manner.

When my process is applied to the distillation of petroleum the same is rendered non-explosive, as the air carries off the light and dangerous hydrocarbon gases, leaving the distilled petroleum in a pure and deodorized condition.

There are two other very important advantages derived by my treatment, consisting, first, in great saving in time, because the vapors, being carried off so soon as generated, are more quickly evolved; and, secondly, the pressure in the distilling apparatus being considerably lessened the heat required is thereby reduced, and a saving of at least forty per cent. of fuel produced.

As my process can be carried on in any of the existing stills or any device used for that purpose, by attaching to it or them a suitable blowing apparatus, I have not deemed it necessary to illustrate it by drawings or models, the process being easily understood without their use.

What I claim as my invention, and desire to secure by Letters Patent, is—

The improvement in distillation above described and for the purposes specified.

ORAZIO LUGO.

Witnesses:
A. L. KENNEY,
EDM. F. BROWN.